United States Patent
Lee

(10) Patent No.: US 12,498,226 B2
(45) Date of Patent: Dec. 16, 2025

(54) METHOD AND APPARATUS FOR DATA ANALYSIS PROCESSING OF HETEROGENEOUS SHIP NAVIGATION BASED ON DIGITAL FORENSICS

(71) Applicant: ELECTRONICS AND TELECOMMUNICATIONS RESEARCH INSTITUTE, Daejeon (KR)

(72) Inventor: Byung Gil Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 225 days.

(21) Appl. No.: 18/236,576

(22) Filed: Aug. 22, 2023

(65) Prior Publication Data

US 2024/0175686 A1  May 30, 2024

(30) Foreign Application Priority Data

Nov. 28, 2022  (KR) .................. 10-2022-0162015

(51) Int. Cl.
*G06F 16/00* (2019.01)
*G01C 21/20* (2006.01)
*G06F 16/25* (2019.01)

(52) U.S. Cl.
CPC ......... *G01C 21/203* (2013.01); *G06F 16/258* (2019.01)

(58) Field of Classification Search
CPC .................................... G06F 16/258
See application file for complete search history.

(56) References Cited

U.S. PATENT DOCUMENTS 10,191,151 B2   1/2019  Lee
2003/0046003 A1*  3/2003  Smith ............... G01C 15/00
                                                   342/357.31

(Continued)

FOREIGN PATENT DOCUMENTS

JP       2008-198136 A    8/2008
KR   10-2017-0043213 A    4/2017

(Continued)

OTHER PUBLICATIONS

KIPO Office Action, dated Nov. 27, 2023, for Korean Patent Application No. 10-2022-0162015 which corresponds to the above-identified U.S. application.

(Continued)

*Primary Examiner* — Khanh B Pham
(74) *Attorney, Agent, or Firm* — LRK PATENT LAW FIRM

(57) ABSTRACT

An apparatus for analyzing and handling heterogeneous navigation data includes an evidence collection unit that collects evidence material relating to an accident; an evidence data analysis unit that verifies the integrity of the collected evidence material, and if the collected evidence material is collected from a plurality of manufacturers' equipment models, restores navigation data by analyzing evidence data relating to the collected evidence material; an integrated navigation data handling unit that generates an evidence-based integrated navigation pattern for different forms of navigation data, including original information, information on relevance to the original information, and an evidential material for extraction to be used as evidence, and stores the integrated navigation pattern in a standard format; and an accident reconstruction analysis management unit that simultaneously presents multiple pieces of heterogeneous data by layering the integrated navigation pattern, and (Continued)

reconstructs and analyzes the accident for each time slot of each track.

18 Claims, 10 Drawing Sheets

(56) References Cited

U.S. PATENT DOCUMENTS

| | | | |
|---|---|---|---|
| 2003/0095601 A1* | 5/2003 | Kondo | G06T 7/20 375/240.16 |
| 2013/0086109 A1* | 4/2013 | Huang | G06F 16/487 707/E17.014 |
| 2014/0245454 A1 | 8/2014 | Lee et al. | |
| 2020/0218546 A1* | 7/2020 | Aggarwal | G06F 9/4416 |
| 2021/0110032 A1* | 4/2021 | Yip | G06F 21/602 |
| 2021/0132784 A1* | 5/2021 | Conlon | G06Q 10/0833 |

FOREIGN PATENT DOCUMENTS

| | | |
|---|---|---|
| KR | 10-2155240 B | 9/2020 |
| KR | 10-2020-0129879 A | 11/2020 |
| KR | 10-2311462 B | 10/2021 |
| KR | 10-2022-0055816 A | 5/2022 |
| KR | 10-2022-0075801 A | 6/2022 |

OTHER PUBLICATIONS

Hyun-Hee Jung, "Management from the Perspective of the Life Cycle of Digital Evidence", Journal of Digital Forensics 10(1), Jun. 2016, 1-20(20 pages).

* cited by examiner

METHOD AND APPARATUS FOR DATA ANALYSIS PROCESSING OF HETEROGENEOUS SHIP NAVIGATION BASED ON DIGITAL FORENSICS

CROSS-REFERENCE TO RELATED APPLICATION

The present application claims priority to Patent Application No. 10-2022-0162015, filed on in Korea Intellectual Property Office on Nov. 28, 2022, the entire contents of which are incorporated herein by reference.

BACKGROUND

1. Technical Field

The present disclosure relates to a method and apparatus for analyzing and handling heterogeneous navigation data based on digital forensics.

2. Description of Related Art

Generally, data relating to events and accidents in ships, motor vehicles, etc. is stored in different formats in storage of navigational equipment or a navigation data recorder which is equipped in multiple moving transport object such as ships and motor vehicles. Thus, when a data forensic analysis process is performed by a navigation briefing device, data from the same type of equipment can be reproduced, but it is difficult to reproduce and analyze format data extracted from different types of equipment or different models simultaneously for a particular slot, along with evidence handling.

Moreover, the navigation briefing device has issues in systematically managing intermediate acquisition steps such as collection, analysis, and reporting of evidence material.

Even with an integrated system, reported data occasionally has little relevance to original data even though it is only altered by a simple change, and therefore the data may lose its legal validity as evidence material or may be used only as reference no matter how important it is as evidence material.

SUMMARY

In view of the above, the present disclosure provides a method and apparatus for reconstructing an accident as it happened at that time with respect to multiple moving transport object even if they all have different data formats.

Furthermore, the present disclosure provides a method and apparatus that have a data structure for aggregating different data received from a plurality of pieces of navigational equipment equipped in multiple moving transport object, and that ensure the relevance and integrity of evidence with original data.

Furthermore, the present disclosure provides a method and apparatus that integrate a plurality of format data by providing a format for integrating the data structure and find a more perfect track point to connect and reproduce insufficient data.

Furthermore, the present disclosure provides a method and apparatus that performs precise analysis by supplementing additional information between moving objects which interfere with each other in a time-series analysis based on time points.

According to an embodiment of the present disclosure, an apparatus for analyzing and handling heterogeneous navigation data includes an evidence collection unit that collects evidence material relating to an accident; an evidence data analysis unit that verifies the integrity of the collected evidence material, and if the collected evidence material is collected from a plurality of manufacturers' equipment models, restores navigation data by analyzing evidence data relating to the collected evidence material; an integrated navigation data handling unit that generates an evidence-based integrated navigation pattern for different forms of navigation data, including original information, information on relevance to the original information, and an evidential material for extraction to be used as evidence, and stores the integrated navigation pattern in a standard format; and an accident reconstruction analysis management unit that simultaneously presents multiple pieces of heterogeneous data by layering the integrated navigation pattern, and reconstructs and analyzes the accident for each time slot of each track.

According to an embodiment of the present disclosure, a method for collecting evidence material relating to an accident; verifying the integrity of the collected evidence material, and if the collected evidence material is collected from a new manufacturer's equipment model, restoring navigation data by analyzing evidence data relating to the collected evidence material; generating an evidence-based integrated navigation pattern for different forms of navigation data, including original information, information on relevance to the original information, and an evidential material for extraction, and storing the integrated navigation pattern in a standard format; and simultaneously presenting multiple pieces of data by layering the integrated navigation pattern, and reconstructing and analyzing the accident for each time slot of each track.

The present disclosure allows for reconstructing an accident as it happened at the time with respect to multiple moving transport object even if data stored in storage of their navigational equipment or navigation data recorder has different formats.

The present disclosure enables systematic analysis of every aspect of an accident by performing an integrated analysis of data from various equipment and various ships simultaneously at a time in accordance with a data management system, thereby maintaining the accuracy of the accident analysis and the continuity and integrity of the data and increasing the validity of evidence.

The present disclosure allows for analysis of accident data and simultaneous analysis of data relating to accidents in a variety of ships, control systems, etc. as a preventive measure against such accidents, and also makes it possible to perform an accident cause analysis and take action accordingly, which can prevent such accidents in the future.

The present disclosure can reduce errors in analyzing accidents by collecting and applying more data, and prevents evidence from becoming inadmissible by solving issues concerning the time taken to identify and classify each piece of evidence and establishing connections among pieces of evidence.

DETAILED DESCRIPTION

Figure 1A:
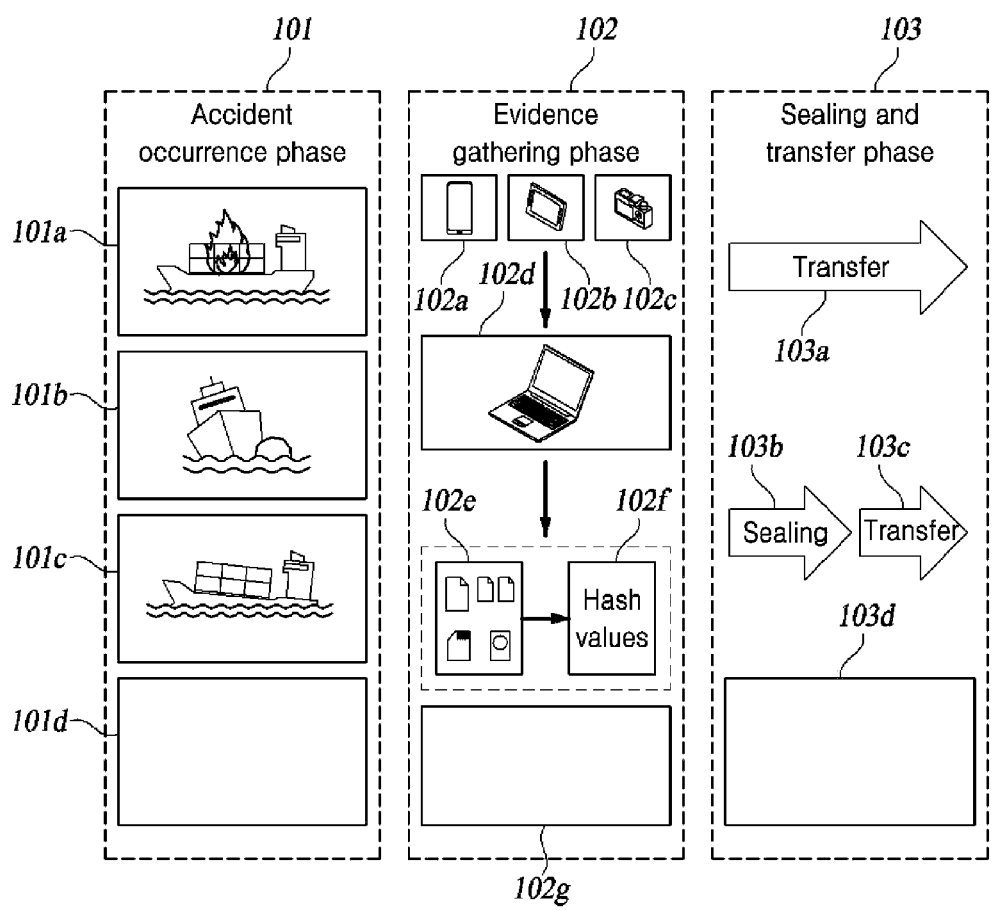
FIGS. 1A, 1B, 2A, and 2B are views of a system structure for handling navigation data based on digital forensics according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

The following detailed description is intended to describe exemplary embodiments of the present invention and is not intended to represent the only embodiments in which the present invention may be practiced.

Data relating to accidents in ships, motor vehicles, etc. is stored in different formats in storage of navigational equipment or a navigation data recorder which is equipped in multiple moving transport object. Thus, in a data forensic analysis process, data from the same type of equipment can be reproduced, but it is difficult to reproduce format data of different types of equipment or different models simultaneously for a particular slot, along with evidence handling.

To resolve the above-described problems, the present disclosure may include: a process of identifying different data structures and analyzing navigation data, a process of handling information from the original evidence and information extracted from the original as evidence in order to change a slot of interest from the navigation data into a standard format; a process of information required for analysis by making alterations; a process of integrating and storing the information; a process of retrieving individual stored data and simultaneously presenting navigation data of multiple moving transport object; and a process of visualizing the presented data to accurately analyze each time slot of the situation. That is, the present disclosure relates to an apparatus that analyzes accidents in multiple moving transport object by adding required information to convert it into a unified form and reproduce it, reconstructing the accidents as it happened at the time. The apparatus according to an embodiment of the present disclosure includes: an evidence collection unit that collects evidence material relating to an accident; an evidence data analysis unit that verifies the integrity of the collected evidence material, and if the collected evidence material is collected from a new manufacturer's equipment model, restores navigation data by analyzing evidence data relating to the collected evidence material; an integrated navigation data handling unit that generates an evidence-based integrated navigation pattern for different forms of navigation data, including original information, information on relevance to the original information, and an evidential material for extraction, and stores the integrated navigation pattern in a standard format; and an accident reconstruction analysis management unit that simultaneously presents multiple pieces of data by layering the integrated navigation pattern, and reconstructs and analyzes the accident for each time slot of each track. The standard format includes a JSON (JavaScript Object Notation)-based format. The integrated navigation data handling unit stores data in a maritime-related system, including ships, original evidence data, original information taken from the original and extracted for accident analysis, and the information on relevance to the original information for establishing the legal relevance of extracted evidence. The integrated navigation handling unit stores relevance information of a ship or land system or other equipment from which data is extracted, based on the JSON. The integrated navigation data handling unit stores actual data information which involves navigation data of a ship or land system or equipment from which data is extracted, based on the JSON. The integrated navigation data handling unit stores data extracted from a plurality of systems or equipment in the standard format and stores a plurality of pieces of data extracted from the multiple pieces of original data in a single JSON file. The accident reconstruction analysis management unit simultaneously presents various data stored in the standard format extracted from a plurality of systems or equipment, and reconstructs the accident for each time slot. The accident reconstruction analysis management unit reconstructs and analyzes the accident by processing final collected navigation evidence as integrated navigation data in analyzing the accident. The information on relevance to the original information includes information on a person responsible for analysis and processing, the original information, original hash values, where in the original information data is extracted, a standard method of storing processed data, hash values, and so on. The evidential material for extraction may include information on a ship, such as number of tons, length information, type of ship, and so on. The following is an example of part of a JSON format storage structure. Here, the JSON format includes attributes including hash values of the original navigation file, number of tracks, and hash values for respective pieces of data.

---

```
JSON Format example :
{
  "FORMAT": "ETRI SAIDA CASE EVIDENCE",
  "MAKER": "ETRI",
  "VERSION": 2022,
  "FILES": [
{
"mgmt_id": "D20220101A",
    "Case_Info": {
```

```
            "case_id": "KICS2022-11250011",
            "case_summary": "2022.06.03 ship crashed",
            "case_address": "incheon ",
            "case_datetime": "2022-06-03T13:56+09:00",
            "case_data_gathering_datetime": "2022-06-05T14:16+09:00"
            "case_data_processing_investigator name": "Kim Cheol-Soo, Director for Scientific
Investigation and Analysis, South Regional Headquarters Korea Coast Guard"
        },
    "Vessels": [
        {
            "vessel mgmt_id": "D20220101A-V001",
            "vellel_id": 1,
            "Vessel_Info": {
                "vessel_name": "marineboy",
                "vessel_type": "fishingboat",
                "vessel_tonnage": "10",
                "vessel_length": "10"
            },
"Equipments": [
            {
                "mgmt_id": "D20220101A-V001-E001-D000",
                "vessel_id": 1,
                "equipment_id": 1,
                "equipment_info": {
                    "type": "GPS Plotter",
                    "manufacturer": "samsung",
                    "model": "NF100A",
                    "serial": "12345",
                    "description": "in ship ",
                    "note": "no time delay with GPS"
                }
            },
            {
                "mgmt_id": "D20220101A-V001-E002-D000",
                "vessel_id": 1,
                "equipment_id": 2,
                "equipment_info": {
                    "type": "GPS Plotter",
                    "manufacturer": "rolence",
                    "model": "HDS7",
                    "serial": "12345",
                    "description": "in ship",
                    "note": "no time delay with GPS "
                }
            },
    "CTRACK": [
        [
            {
        "mgmt_id": "D20220101A-V001-E001-T000",
        "track_id": 1,
                "original track_file info": {
                    "equipment id": "D20220101A-V001-E001-D000",
                    "file name": "TRACK.DAT",
                    "file size": "594,473,234",
                    "hash type": "SHA1"
                    "hash value":
                    "8fed289c354cc0d048432b6d8ff11d049d4e34cc",
                    "file created date": "2022-06-05T14:16+09:00"
                    "file_path": "2022/D20220101A/VesselData/V001/E001",
                    "track point number": "3",
                }
            }
        ]
        [
            1,                                            // First point on track
        1662698134.881,
        127.0276467,                          // Longitude of first point on track
        37.5835067,                           // Latitude of first point on track
        180.0,
        0.0,
            6fed389c354cc0d043432b3d8ff11d043d4e33cd,     // track point Hash value
        -1
        ],
        [
        2,
        1662698135.881,
        127.0276467,
        37.5835044,
        321.6043986790451,
```

```
        0.4794326160326698,
            7fed389c354cc0d043432b3d8ff12d043d4e33ca,        // track point Hash value
        -1
    ],
    [
        3,
        1662698136.881,
        127.0276444,
        37.5835067,
        345.20301867447563,
        0.6127221465027619,
            3ed339c354cc0d043432b3d8ff12d043d4e34vd,         // track point Hash value
        -1
    ],
  ]
}
```

The present disclosure relates to a method of integrating evidence data generated from various equipment while complying with the rules stating that digital evidence material should be admissible in order to establish evidence from numerous accidents, and a method of simulating this method.

More specifically, data collected from equipment at an accident site where forensics is used has different formats for each piece of equipment—which means that, even with navigation data from the same type of navigational equipment, the format, content, and type of data vary depending on the manufacturer when it comes down to the details, and such data is extracted accurately from the original data. That is, the present disclosure relates to information processing that stores data by generating a unified format by establishing an evidence data management system that shows a flow of data without data loss, from the equipment that has collected the data first, the original navigation evidence data, and source information extracted from the original, and visually presents the stored evidence data in a digital forensics analysis process for the accident to conduct analysis.

In a narrow sense, the present disclosure relates to a technique of analyzing accidents in medium-to-small sized ships and a forensics technology for this technique, in which track information stored in memory of navigational equipment equipped in a medium-to-small sized ship is extracted, operation track metadata from the ship's navigational equipment and corresponding ship navigation data from a land control system are compared and integrated with each other based on extracted information on tracks traveled based on GPS (Global Positioning System) to calculate the ship's speed and time, and the situation of the accident and the time of perception are analyzed from each point of view and used to analyze the cause of the accident and provide evidence of the accident. In particular, the background art of the present disclosure is the technology of forensics relating to accidents which is an expandable technology, and, on top of this, involves technologies that can be expanded and used in all fields of digital forensics that deal with accidents and legal evidence.

The proceedings carried out by investigation agencies and law enforcement agencies will be described to explain the background of this disclosure. That is, a procedure for dealing with evidence will be performed in the following order. An investigation agency obtains rights to investigate a case to deal with the case, collects evidence, transfers the collected evidence (the process of transfer can be omitted), and analyzes the collected evidence. On the other hand, a law enforcement agency conducts procedures such as transfer, trial preparation, testimony in court, reversal, and so on, in order to deal with a case. In South Korea, government investigation agencies and private investigation agencies began using digital data as evidence in courts of law by adopting digital forensics starting since the early 2000s. Recently, smartphones, CCTV, black boxes, etc. are increasingly used as clues for investigation, which often make digital evidence decisive factors in investigations and trials. For this reason, investigation agencies collect and extract all kinds of digital data from people involved in the accident and analyze and use it as evidence, and this evidence material is transferred and used as exhibits for trials.

Through these procedures, however, the evidence material can be damaged. To solve this problem, there are four principles as criteria for handling evidence: integrity, hashing, justifiability, and preservation of evidence.

Integrity means ensuring that the act of handling evidence does not modify the original. Hashing means ensuring that no changes are made in the data. Justifiability means that investigators should be able to justify all actions and methods used in handling the original. That is to say, as in the present disclosure, a connection management system is required in a process of changing various evidence data into standardized data to analyze a particular slot of the evidence, in order to find relevance to the original and where and how changes are made.

Preservation of evidence means that all methods and procedures used in handling evidence should be recorded and kept and examined by a third party. Although it is a complicated procedure, these principles should be followed in order to maintain legal validity.

Under an environment where these principles are complied with, when there are multiple ships involved in an accident, data collected from multiple pieces of navigational equipment should be handled, and even a single ship may be equipped with multiple pieces of navigational equipment and data collected from the multiple pieces of navigational equipment is collected and stored at different times, which means that data from only one source will not be enough for accident analysis. Besides, there may be a variety of information sources since the ship's navigation information can be collected from a situation room as well, apart from data collected from the ship. Data from various sources cannot be handled in a unified manner since it is stored in different formats for each manufacturer. In analyzing an accident, such information should be handled and entered in the same format to visually reconstruct data collected from multiple sources on the same screen, whereas data in different forms involves making alterations to the data, making it inconvenient to reproduce the data in synchronization.

Therefore, the present disclosure relates to a method for establishing a system capable of identifying evidence according to principles and managing the evidence in a unified form. That is, the present disclosure includes a method of integrating evidence identifying how conversions are made from the original during the integration process and a technology of managing this method, and relates to a structure for unified data and an analysis process for reproducing the data.

Evidence material or content of an accident, regardless of whether it occurs in a marine environment or a land environment, is stored in different forms since the evidence does not come from the same equipment, and therefore the present disclosure includes a valid method of identifying and integrating each piece of evidence.

In general, there is no system that integrates evidence material collected from different equipment in a single (standard) format and turns it into evidence. That is, in the maritime sector, marine forensics is only in its initial stage, and there has been no instance, even on land, of a forensic technology being applied to integrate collected evidence data, extract part of the data grounded on evidence, and reproduce it.

The present disclosure involves presenting navigation data by re-analyzing each format data for each instance of collecting evidence material and related information and providing a chain-based system for linking evidence data collected from various equipment to the original data. Furthermore, the present disclosure intends to generate information for reconstructing and analyzing an accident by regenerating it into a particular integrated format, and to organize the management information into the same standard format, generating it into integrated data that can be easily reproduced.

In a process of collecting, transferring, and analyzing digital evidence according to an embodiment of the present disclosure, a continuous record of transfer between entities that keep evidence can be accurately made along with its history.

First-order applications of this method will be described with respect to the maritime sector, but are not limited thereto.

That is, in the present disclosure, the person who obtains and handles evidence, the handling process, how it is handled, relevance to the original, and hash values are recoded, so that it can be proved by hashing that digital evidence is managed as is collected initially, without any alterations, or slot data from the original can be managed as justifiable evidence.

The present disclosure relates to a system in which original data of collected digital evidence is identified in analysis, and a continuous record of transfer of information handled in association with the original information is accurately recorded along with its history. That is, evidence is acquired, and the evidence is altered by extracting the original information and a reliable slot from the original in the process of evidence analysis, which is repeated for each instance. That is, the present disclosure relates to a forensic analysis technology that integrates different data into a single format and simultaneously presents multiple moving transport object for analysis, by including a management system that ensures that digital evidence in its initially collected state is managed in accordance with a proper alteration management system by recording the person in charge of analysis and handling, the original information, original hash values, where in the original information data is extracted, a standard method of storing data to be handled, and hash values.

The present disclosure is not limited to the foregoing aspects, and other aspects not mentioned herein will be able to be clearly understood by those skilled in the art from the following description.

FIGS. 1A, 1B, 2A, and 2B are views of a system structure for handling navigation data based on digital forensics according to an embodiment of the present disclosure.

Figure 2A:
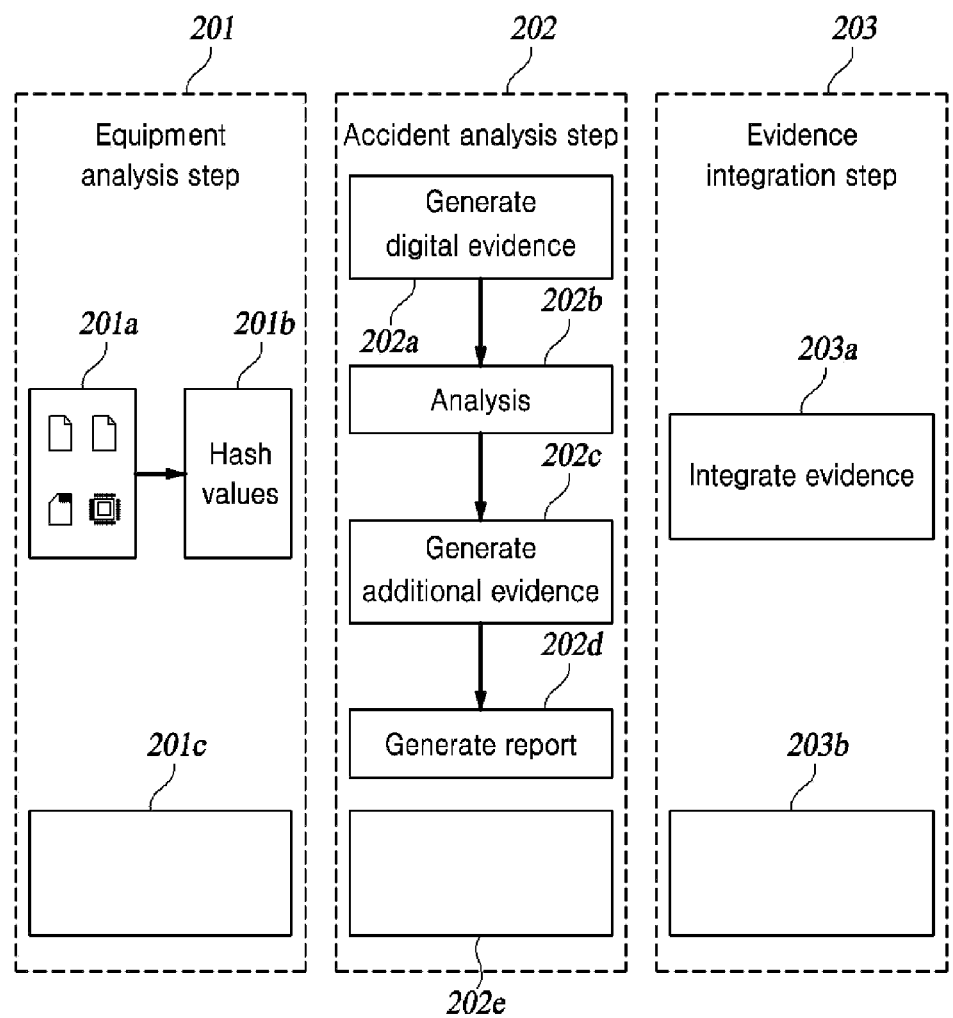
Figure 2B:
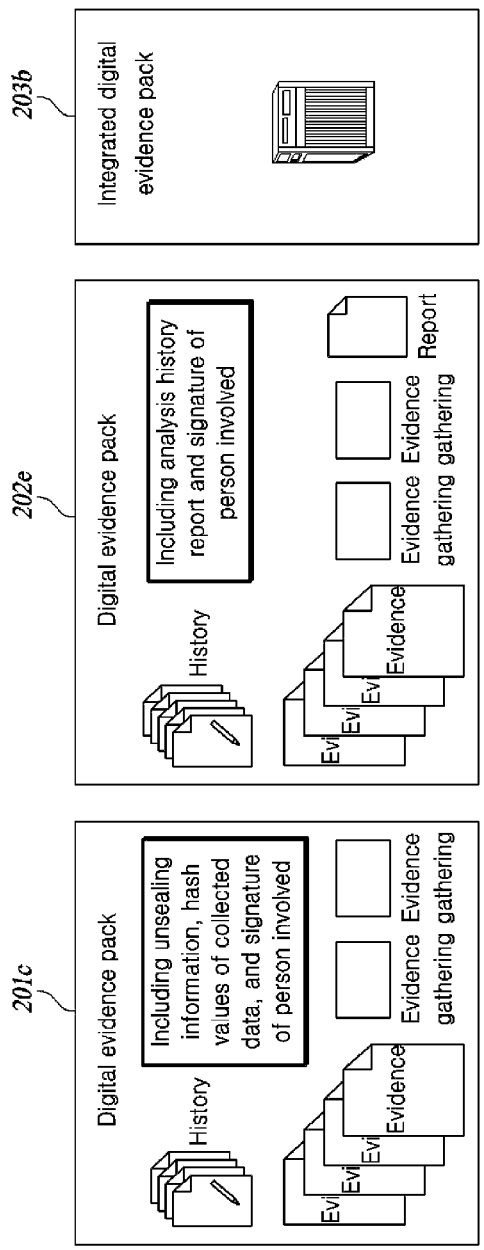

FIGS. 1A and 2A show a continuous structure. That is, the operation with Reference Numeral 201 in FIG. 2A may be performed after Reference Numeral 103 in FIG. 1A.

The present disclosure will be described with respect to an example in which a moving object involved in an accident is a ship, but is not limited thereto.

Reference Numeral 101 represents an accident occurrence phase (generation of accident data), Reference Numeral 102 represents an evidence collection phase (generation of an evidence package), Reference Numeral 103 represents an evidence sealing and transfer phase (generation of an evidence package, which can be omitted in some cases), Reference Numeral 201 in FIG. 2A represents an equipment analysis phase (generation of an evidence package), Reference Numeral 202 represents an accident analysis phase (generation of an evidence package), and Reference Numeral 203 (generation of an evidence package) represents a block that performs an evidence integration step.

As for Reference Numeral 101, accident information is stored in storage (including navigational equipment, a navigation recording device, etc.) equipped in each moving object. The accident information may include the time of occurrence of the accident, the location of the accident, and ship information showing the manufacturer of the moving object.

Figure 1B:
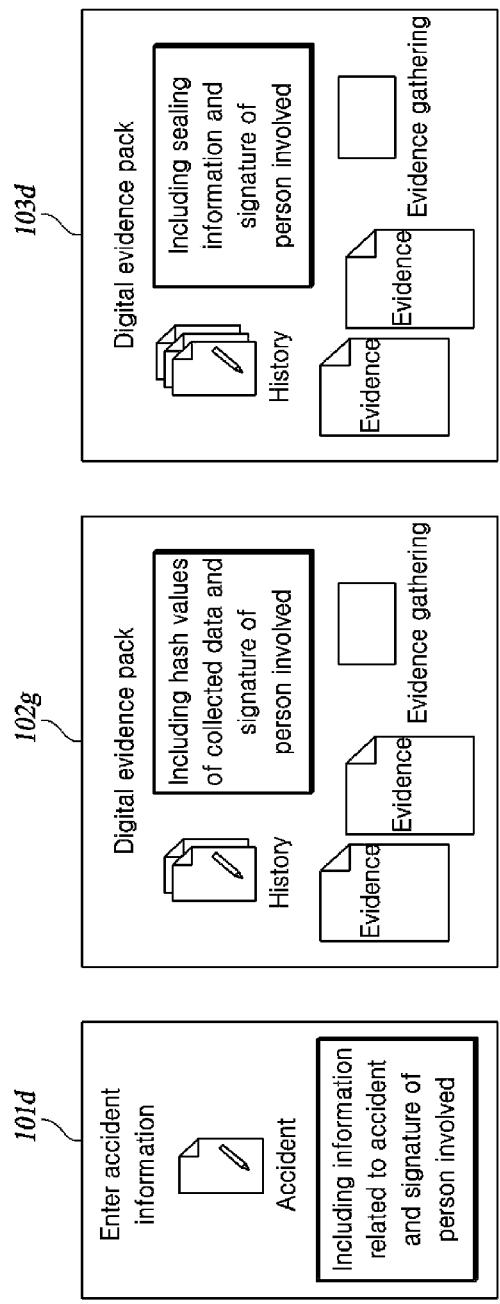

Here, Reference Numeral 101*a* represents navigational equipment equipped in Ship A, Reference Numeral 101*b* represents navigational equipment equipped in Ship B, and Reference Numeral 101*c* represents navigational equipment equipped in Ship C. The manufacturers of the navigational equipment of Reference Numerals 101*a* to 101*c* may be the same or different. Reference Numerals 101*a* to 101*c* represent an example of various accidents. Referring to FIGS. 1A and 1B, Reference Numeral 101*d* represents an operation for entering accident information, by which the signature of a person involved in the accident, as well as information related to the accident, may be entered.

Reference Numerals 102*a*, 102*b*, and 102*c* each represent storage, and Reference Numeral 102*d* represents a device that collects data from Reference Numerals 102*a*, 102*b*, and 102*c*. Data collected from Reference Numeral 102*d* may be generated through the process of Reference Numerals 102*e* and 102*f*. Reference Numeral 102*e* may include a process of connecting an SD card to an imaging device for write protection. Reference Numeral 102*f* may include a process of hashing to ensure integrity after Reference Numeral 102*e*.

Reference Numeral 102 represents a phase in which evidence material is collected based on data stored in each storage device. As for Reference Numeral 102, in a case where there is a previously inserted SD card, the inserted memory card is imaged first, and then navigation data is identified from a piece of equipment and transferred to the SD card. Hash values for data may be generated and at the same time imaging may be performed while the SD card is connected to an imaging device and write-protected. Here, the imaging means making all physical data in the storage into a file form.

There may be additional equipment in Reference Numeral 102, the presence of additional equipment is detected, and evidence is repeatedly collected.

The evidence material may include navigation data and gathered evidence.

In Reference Numeral 102, HDD and SDD, as well as SD cards, may be used.

Reference Numeral 103 represents a phase in which data is sealed (103b) or transferred (103c) to prevent data loss in navigational equipment or storage. In the phase of Reference Numeral 103a, data can be transferred without being sealed.

Reference Numeral 201 represents an equipment analysis phase, in which sealed data is unsealed and the data is analyzed.

To identify data, it is necessary to check imaging data 201a and hash values 201b to verify integrity. That is, Reference Numeral 201a may include a process of checking imaging data, and Reference Numeral 201b may include a process of checking hash values.

Reference Numeral 201 represents an equipment analysis phase, in which navigation data may be extracted from a storage medium for extracting navigation data collected from equipment, by dumping raw data and analyzing the dumped data. Once the extracted navigation data and equipment data related to the ship's condition are restored, evidence equipment analysis is performed as evidence that serves as a new key, and then navigation data that can be analyzed for each piece of equipment and for each model can be identified.

Reference Numeral 202a represents a process of generating digital evidence.

Reference Numeral 202b represents a process of analyzing generated digital evidence using a forensic analysis technology. Information on the ship and other ships or information on the ship and its surroundings such as stranded objects, floating objects, light buoys, other ships, the situation at sea, the direction and speed of the wind, the sea fog, and so on is analyzed to analyze the cause of the accident. Through this analysis, how a collision between ships happened may be examined through a simulation of the navigation data.

Reference Numeral 202c represents a process of generating additional digital evidence. In Reference Numeral 202b, once the analysis of the accident matches accurate records of information and evidence, these records are generated as evidence, and may be managed as a history to show which original data they are legally generated from.

Reference Numeral 202d represents a process of generating a report based on analysis results and additional digital evidence.

Reference Numeral 202e represents an accident analysis step. In the accident analysis step, information on the ship and other ships or information on the ship and its surroundings stranded objects, floating objects, light buoys, other ships, the situation at sea, the direction and speed of the wind, the sea fog, and so on may be analyzed to analyze the cause of the accident.

Through this analysis, how a collision between ships happened may be examined through a simulation of the navigation data. Once the analysis of the accident matches accurate records of information and evidence, these records are generated as evidence, and may be managed as a history to show which original data they are legally generated from.

Reference numeral 203 represents an evidence integration step, in which a digital evidence pack is generated based on SML. Based on an integrated digital evidence pack, the accident may be visually reconstructed, and how the ship traveled the route may be presented on an electronic navigation chart. Moreover, Reference Numeral 203a represents a process of generating evidence material by analyzing video or captured images. In this process also, it is necessary to ensure integrity by hashing.

In Reference Numerals 102g, 103d, 201c, 202e, and 203b, data obtained from each step may be integrated (packaged), thereby generating a digital evidence pack as depicted in FIGS. 1A and 2A. Here, the digital evidence pack may refer to a digital evidence file.

In Reference Numeral 102g, the digital evidence pack may include evidence data, hash values of collected data, the signature of a person involved, and metadata (time, location, etc.).

In Reference Numeral 103d, the digital evidence pack may include evidence data, sealing information, hash values of collected data, the signature of a person involved, and metadata (time, location, etc.).

In Reference Numeral 201c, the digital evidence pack may include evidence data, unsealing information, hash values of collected data, the signature of a person involved, and metadata (time, location, etc.).

In Reference Numeral 201e, the digital evidence pack may include evidence data, an analysis history report, hash values of collected data, the signature of a person involved, and metadata (time, location, etc.).

In Reference Numeral 203d, an integrated evidence pack is generated based on XML. Based on an XML (Extensible Markup Language)-based integrated evidence pack, a process of conversion from the original data can be identified, and a unified data structure can be represented. The method of representation is as follows.

The present disclosure requires a process in which, if a moving object involved in an accident is a ship, data is extracted from a binary and directly restored by extracting navigation data of different formats for different manufacturers from various pieces of navigational equipment equipped in the ship to make it into evidence, and a process in which a number of pieces of evidence are simultaneously presented and identified for evidence analysis. Thus, the present disclosure includes a process in which information on relevance to the original data and handling information are recorded and managed when changing into integrated information, a process in which an accurate evidence analysis is performed by displaying data of an integrated format on the same screen and reconstructing the data to find the cause of the accident, and a process of generating the identified image data as new evidence.

Figure 3:
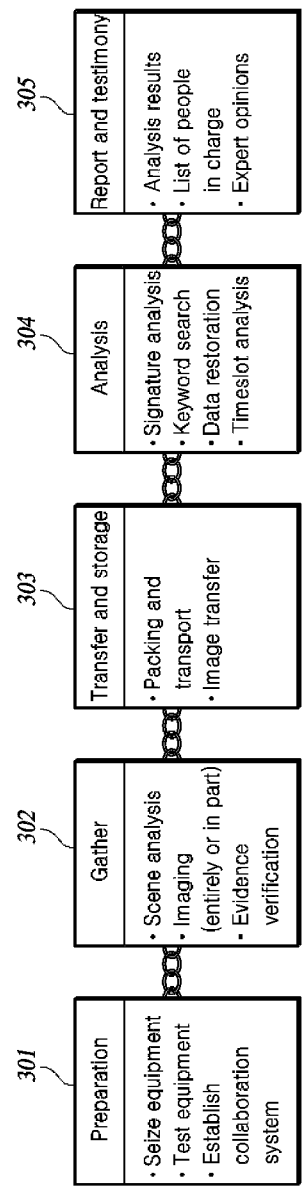
FIG. 3 is a view illustrating a method for handling navigation data based on digital forensics according to an embodiment of the present disclosure.

FIG. 3 is a view illustrating a method for handling navigation data based on digital forensics according to an embodiment of the present disclosure.

A method according to an embodiment of the present disclosure includes a preparation process 301 of seizing equipment, testing the equipment, and establishing a collaboration system, a process 302 of collecting navigation data evidence using data from a ship's navigation equipment, a process 303 of transferring and keeping data or images in storage, an integrated generation process 304 including a link structure that re-analyzes and restores data and then stores in an appropriate form, an accident analysis process 304 of briefing and analyzing multiple pieces of navigation data, and an accident handling evidence management process 305 of generating new evidence using analysis results. The accident handling evidence management process 305 may include reporting analysis results and reporting a list of people in charge and expert opinions.

Figure 4:
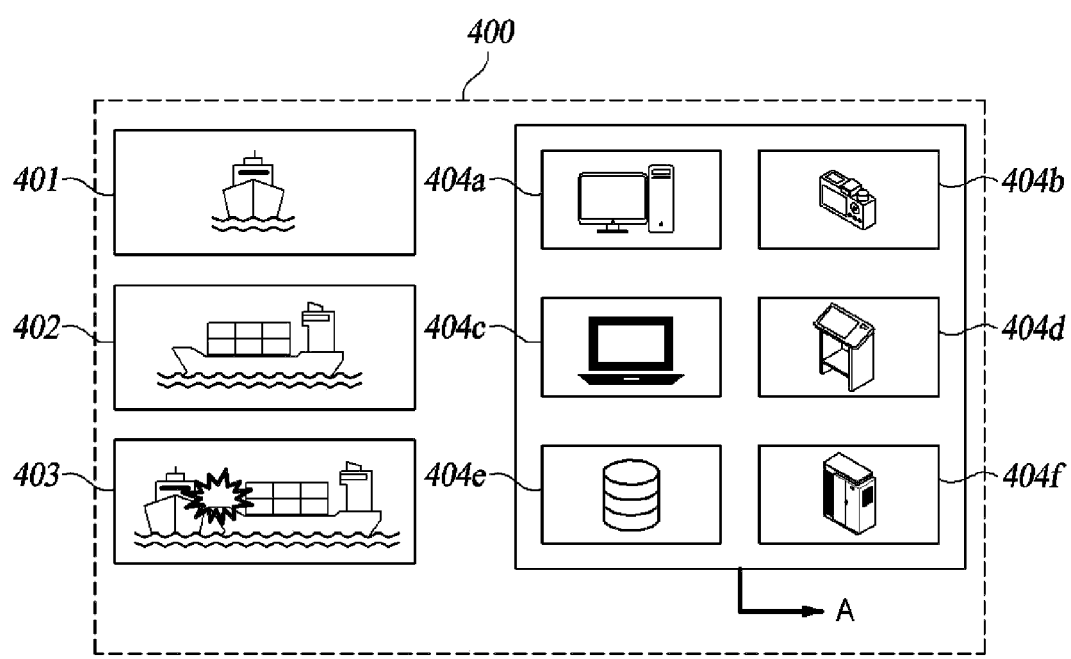
FIGS. 4 and 5 are views illustrating a method for analyzing an accident according to an embodiment of the present disclosure.
Figure 5:
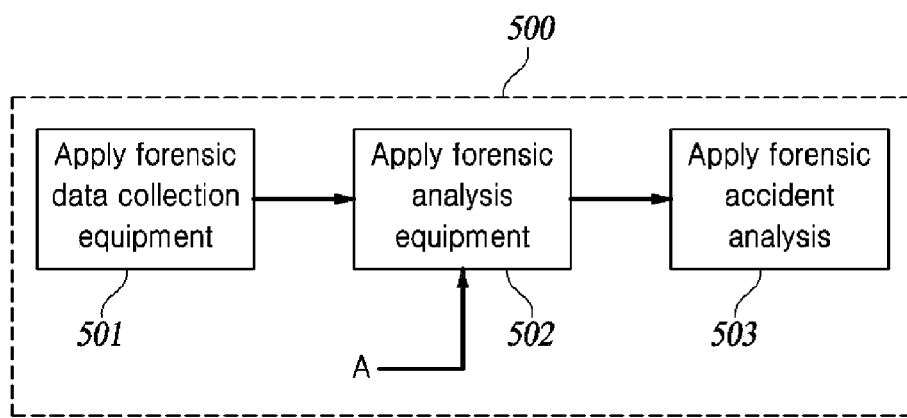

FIGS. 4 and 5 are views illustrating a method for analyzing an accident according to an embodiment of the present disclosure. FIGS. 4 and 5 show a continuous operation, in which the operation of Reference Numeral 500 is performed after Reference Numeral 400 in FIG. 4.

First, in an accident occurrence step, when an accident occurs as in 401, 402, and 403 of FIG. 4, an investigator sets out to the scene to investigate the accident, gets an understanding of the situation around the accident, and sends for a scientific investigator if necessary. The entire steps are carried out by the operations of FIGS. 1A and 2A.

Reference Numeral 401 represents navigational equipment (e.g., GPS plotter, V-PASS, and AIS) equipped in Ship A, Reference Numeral 402 represents navigational equipment (e.g., AIS, ECDIS, and VDR) equipped in Ship B, and Reference Numeral 403 represents the occurrence of a collision between Ship A and Ship B.

In a storing step, 404a of FIG. 4 is a form of storage of Manufacturer A, which may include a GPS plotter, for example. The GPS plotter provides location information, but time information may or may not be provided depending on the manufacturing company.

In the storing step, 404b of FIG. 4 is a form of storage of Manufacturer B, which may include V-PASS, for example. The V-PASS may provide both location information and time information.

In the storing step, 404c of FIG. 3 is a form of storage of Manufacturer C, which may include an AIS (automatic identification system). The AIS may provide location information, time information, location information and related speed information, direction information, the ship's static information, and so on.

In the storing step, 404d of FIG. 4 is a form of storage of Manufacturer D, which may include an ECDIS (electronic chart display and information system), for example. In this case, since a ship equipped with an ECDIS has an AIS, all information provided by the AIS may be available.

In the storing step, 404e of FIG. 4 is a form of storage of Manufacturer E, which may include a VDR (voyage data recorder). The VDR, often known as a ship's black box, is a system that stores all information on a ship obtained from an ECDIS on a regular basis. Accordingly, navigation information provided by the ECDIS or the AIS may be extracted through the VDR.

In the storing step, 404f of FIG. 4 may include a separate form of storage of ship information from a control room. In the storing step, data may be stored at different times or at different time intervals.

Furthermore, when a scientific investigator is requested to arrive at the scene in an evidence collection step 501, he or she will find out about navigational equipment equipped in the ship and collect navigation data and gathered evidence as evidence material. That is, in the evidence collection step, a marine scientific investigator who arrives at the scene will check on the ships 401, 402, and 403 involved in the accident and the equipment 404a to 404f equipped in these ships, and collect evidence relating to the accident. In the collection process, an imaging device such as an SD (secure digital) card is used to prevent damage to collected original data, and the data is hashed to verify integrity. That is, evidence from the scene collected by the equipment is generated into evidence data collected at the scene. For integrity, hashing and evidence gathering information, log information, and other additional information are recorded too, and a person in charge will sign his or her name.

Reference Numeral 502 corresponds to the step of performing analysis on collected evidence material, in which a storage structure analysis conducted on a storage medium.

In an analysis step, integrity check is conducted to check for alterations to collected data. When data is properly handled, the integrity of the data will be maintained. Once the integrity is confirmed, data collected from each piece of equipment is analyzed. A pretreatment operation (e.g., clean bench operation) may be needed for each piece of equipment. In the case of a flooded ship, cleaning and drying treatment is required.

Navigation data may be extracted from a storage medium for extracting navigation data collected from equipment by dumping raw data and analyzing the dumped data.

When the extracted navigation data and equipment data related to the ship's status are restored, evidence equipment analysis may be performed as evidence that serves as a new key, and then navigation data may be analyzed for each piece of equipment and for each model.

Next, particularly in the accident analysis step (Reference Numeral 503), information on the ship and other ships or information on the ship and its surroundings such as stranded objects, floating objects, light buoys, other ships, the situation at sea, the direction and speed of the wind, the sea fog, and so on may be analyzed to analyze the cause of the accident. Through this analysis, how a collision between ships happened may be examined through a simulation of the navigation data. Once the analysis of the accident matches accurate records of information and testimony (for example, Data A in FIG. 4 matches the data obtained in 502 in FIG. 5, these records are generated as evidence, and may be managed as a history to show which original data they are legally generated from.

As in the step 503 of FIG. 5, the accident may be visually reconstructed, and how the ship traveled the route may be presented on an electronic navigation chart. And, evidence material is generated by analyzing video or captured images. In this process also, it is necessary to ensure integrity by hashing.

Next, collective evidence of the accident is reported to a court. Existing evidence is integrated (packaged) and submitted as a report. This process is identical to the steps shown in FIG. 1A and FIG. 2A, and sealing and unsealing may be applied during the transfer process depending on the transportation conditions.

Next, a procedure according to an embodiment of the present disclosure includes the following steps to achieve the above-described aspects.

Figure 6:
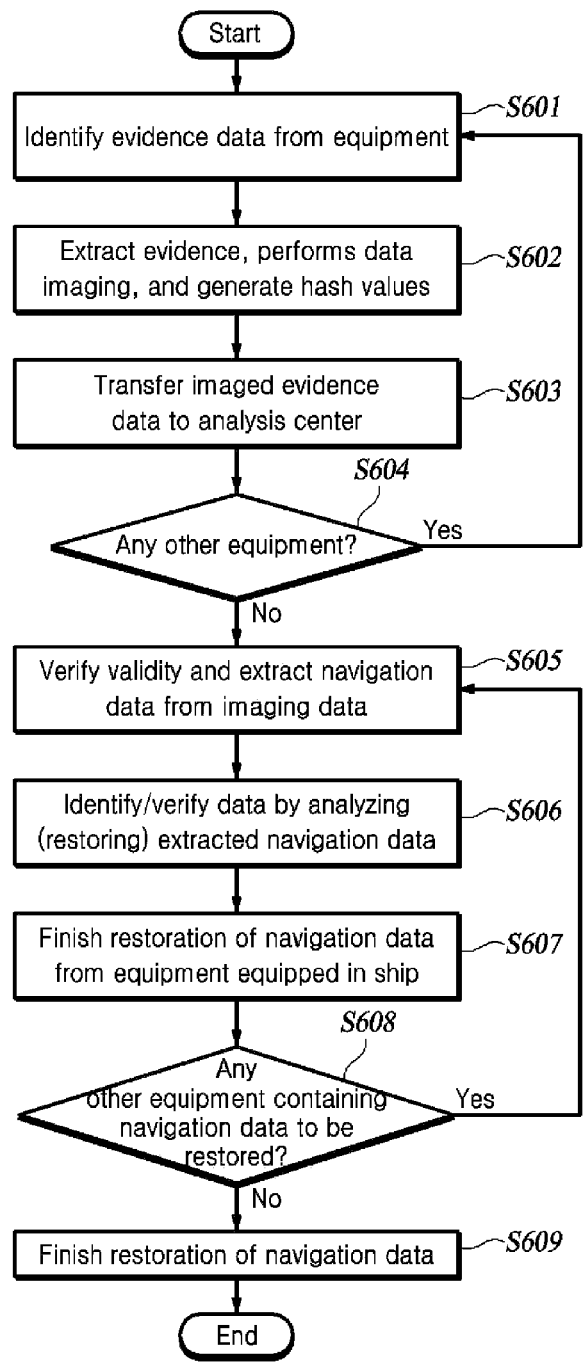
FIG. 6 is a flowchart showing a process of collecting and restoring navigation data by a digital forensics-based navigation data handling apparatus according to an embodiment of the present disclosure.

FIG. 6 is a flowchart showing a process of collecting and restoring navigation data by a digital forensics-based navigation data handling apparatus according to an embodiment of the present disclosure.

That is, in the evidence collection step, evidence from ship and equipment data is collected from accident information, data collected from a control system, apart from the ship, may be identified as evidence, and a process of collecting and restoring evidence including this data is shown in FIG. 6.

The digital forensics-based navigation data handling apparatus identifies evidence data from equipment in the step 601, and the identified evidence is handled using a menu in the equipment by extraction or export and transferred to an SD memory card slot in the equipment.

In a case where there is a previously inserted SD card, the inserted memory card is imaged first, and then navigation data needs to be identified from equipment and transferred to the SD card.

In the step 602, the digital forensics-based navigation data handling apparatus generates hash values for data and at the same time performs imaging while the SD card is connected to an imaging device and write-protected.

In the step 603, the digital forensics-based navigation data handling apparatus transfers imaged analysis data to an analysis center.

Since there may be additional equipment, the digital forensics-based navigation data handling apparatus checks for any other equipment in the step 602, and repeatedly collects evidence. If there is any other piece of equipment, the digital forensics-based navigation data handling apparatus returns to the step 601. On the other hand, if there is no other piece of equipment, and once evidence is collected from all equipment in Ship 1 involved in the accident, the digital forensics-based navigation data handling apparatus repeats the process of checking the next ship for navigational equipment and collecting evidence (step 604).

In the step 603, in the process of transferring imaging data to an analysis center, the data may be transferred to an analysis center depending on the location of the ship or may be transferred to other ships, and may be transferred after all ship data is collected.

If there is no other equipment from which data is to be collected, imaged data is generated simultaneously with imaging information and transferred to an evidence analysis center. Afterwards, the digital forensics-based navigation data handling apparatus needs to check imaging data and hash values and verify integrity in order to identify data. The digital forensics-based navigation data handling apparatus extracts navigation data from the imaging data in the step 605 and then starts analyzing navigation data in the step 606.

Although in the present disclosure, the analysis is conducted after the transfer to the analysis center, the analysis may be done directly at the scene (steps 605 to 609).

The digital forensics-based navigation data handling apparatus restores navigation data collected from the ship in the step 607. In order to restore the navigation data collected from the ship, an understanding of data structures is required since the navigation data has different data structures for different equipment and for different manufacturers.

In the step 608, the digital forensics-based navigation data handling apparatus determines whether there is other equipment containing navigation data to be restored. If there is other equipment containing navigation data to be restored, the digital forensics-based navigation data handling apparatus goes back to the step 605. On the other hand, if there is no other equipment containing navigation data to be restored, the digital forensics-based navigation data handling apparatus proceeds to the step 609 to finish the navigation data restoration process.

In this disclosure, the step 609 represents a state in which the overall restoration is finished since navigation data has been restored, and navigation data from all ships, including that collected from other equipment, has been restored.

It should be noted that information and evidence data is verified by comparing hash values to see if the data is hashed. After such information is processed altogether, individual pieces of navigation data are restored and displayed on an electronic navigation chart for briefing navigation data, which gives an understanding of how the ship traveled. However, navigation data is stored at intervals of several seconds, and the accuracy of the stored navigation data differs for each piece of equipment. Thus, it is highly likely that a single piece of equipment alone will not be enough for this. That is, by adding together information collected from various pieces of equipment with respect to the same track, higher accuracy can be achieved since mutual reliability and insufficiencies in position values are supplemented.

Figure 7:
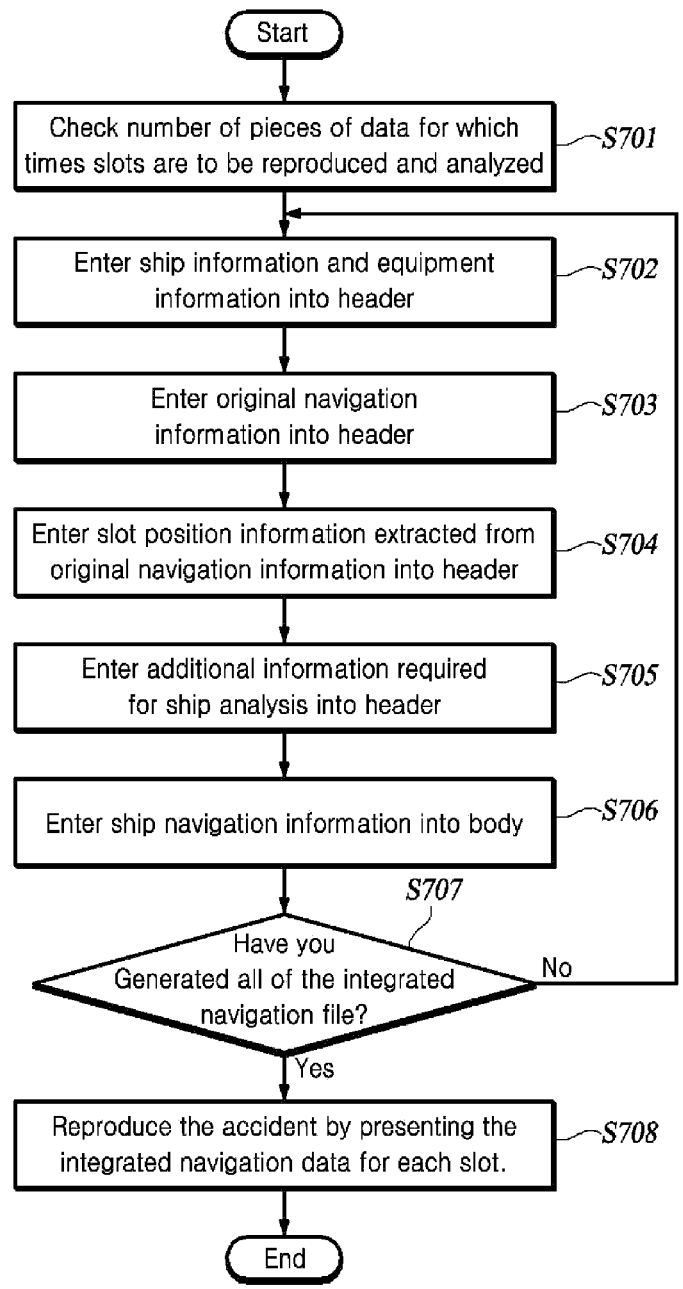
FIG. 7 is a flowchart showing a process of generating integrated data by a digital forensics-based navigation data handling apparatus according to an embodiment of the present disclosure.

FIG. 7 is a flowchart showing a process of generating integrated data by a digital forensics-based navigation data handling apparatus according to an embodiment of the present disclosure.

In FIG. 7, information from each slot of restored navigation data is generated into an integrated form of data, and a data handling step for reconstructing the accident and an accident reconstruction process are performed.

In the step 701, the digital forensics-based navigation data handling apparatus checks the number of pieces of evidence data for which slots are to be reconstructed and analyzed.

The process of extracting slots corresponding to the location of the accident from a first piece of navigation data is to have code relevant to the original data.

In the step 702, the digital forensic-based navigation data handling apparatus enters equipment information and equipment collection information in the process of collecting data from the original data.

Next, in the step 703, the digital forensic-based navigation data handling apparatus enters information on the original navigation data. In this case, the digital forensic-based navigation data handling apparatus generates a file name, size, generation time, hash values, etc. for the original data in JSON in the same format as the header which is the original information data and records from which piece of equipment and which navigation data these are extracted. In the step 704, the digital forensic-based navigation data handling apparatus makes an additional detailed record (entry) of information if necessary, such as from which block from which track data is extracted, the time of extraction, and the person in charge. Here, JSON (JavaScript Standard Object Notation) is a standard JavaScript object notation for representing data when sending and receiving data over the Internet.

In the step 705, the digital forensic-based navigation data handling apparatus may add equipment information (e.g., number of tons, length, ship type, etc.) collected from the scene and reconstruct and display it on the screen so that its performance and functions are checked compared to other ships, in order to generate more precise ship information for the purpose of analysis of the ship accident. In another embodiment, external information such as the direction of waves, the direction of wind, etc. may be added to finely regulate the movement of the ship at the time of simulation. This will be done through reconstruction in real cases, but also may be presented through simulation.

In the step 706, the digital forensic-based navigation data handling apparatus generates data corresponding to the body of actual navigation data showing the movement of the moving object, that is, the ship. In this step, ship direction information such as the latitude and longitude of the ship's position, time, COG (course over ground), and SOG (speed over ground) may be applied as well, which can be displayed when reconstructing the data. However, the data needs to follow the original data, and there will be no discrepancy between the generated data and the original.

In the step 707, the digital forensic-based navigation data handling apparatus checks whether an entire integrated navigation file has been generated. If no entire integrated navigation file has been generated, the digital forensic-based navigation data handling apparatus goes back to the step 702. On the other hand, if an entire integrated navigation file has been generated, the digital forensic-based navigation data handling apparatus proceeds to the step 708 and presents integrated navigation data for each slot to reconstruct the accident.

Once this process is completed, the digital forensic-based navigation data handling apparatus generates data in an integrated form, and integrated navigation data is repeatedly generated for other pieces of equipment.

Figure 8:
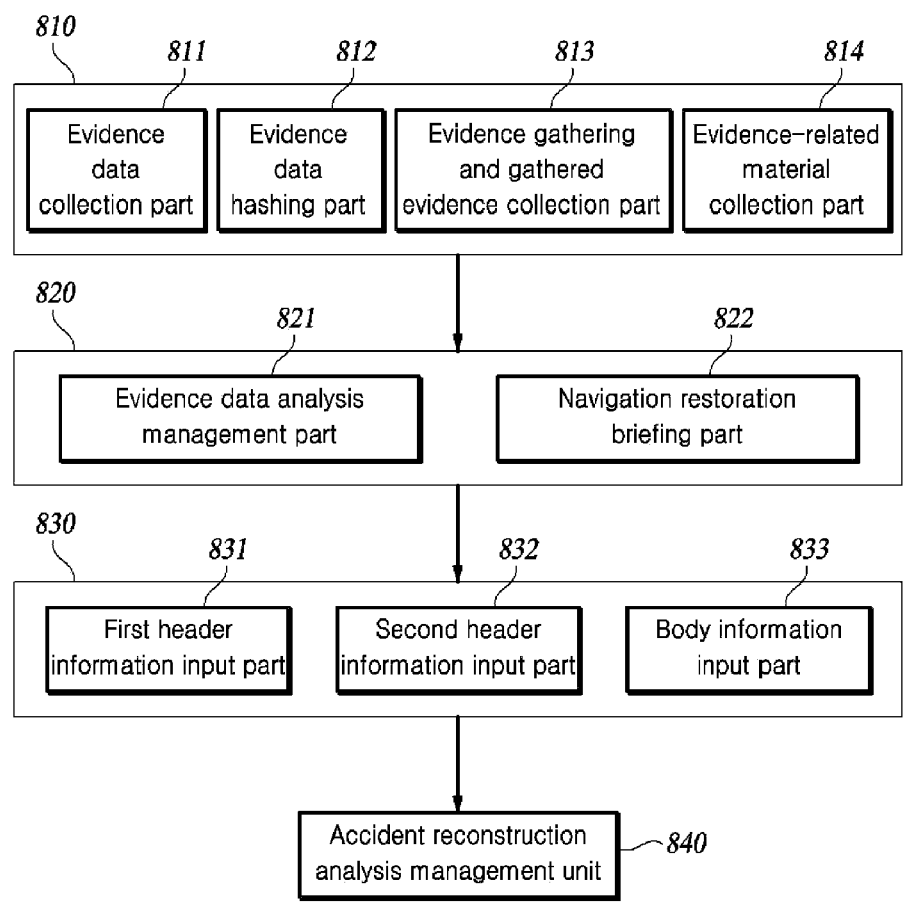
FIG. 8 is a block diagram showing a digital forensic-based navigation data handling apparatus according to an embodiment of the present disclosure.

FIG. 8 is a block diagram showing a digital forensic-based navigation data handling apparatus according to an embodiment of the present disclosure.

The digital forensic-based navigation data handling apparatus according to an embodiment of the present disclosure may include an evidence collection unit 810, an evidence data analysis unit 820, an integrated navigation data handling unit 830, and an accident reconstruction analysis management unit 840.

The evidence collection unit 810 collects evidence. More specifically, it may include an evidence data collection part 811, an evidence data hashing part 812, an evidence gathering and gathered evidence collection part 813, and an evidence-related material collection part 814.

The evidence data collection part 811 may collect evidence data of the ship and equipment from accident information, identify data collected by a control system, apart from the ship, as evidence, and collect evidence including this data.

The evidence data hashing part 812 may be configured to provide integrity by hashing collected data.

The evidence gathering and gathered evidence collection part 813 may be configured to generate gathered information related to evidence and collect gathered data.

The evidence-related data collection part 814 may be configured to collect data based on associations between evidence materials.

Once the integrity of collected evidence material is verified, the evidence data analysis unit 820 may restore navigation data by analyzing evidence data in the case of a new manufacturer's equipment model from which no navigation data has been restored previously.

More specifically, the evidence data analysis unit 820 may include an evidence data analysis management part 821 and a navigation restoration briefing part 822.

The evidence data analysis management part 821 may be configured to analyze and restore collected evidence data.

The evidence restoration briefing part 822 may be configured to give a briefing about restored navigation data. If new evidence is collected from a previously analyzed equipment model, it means that the method of evidence analysis is already known, and therefore the evidence restoration briefing part 822 may immediately restore navigation data and identify navigation restoration results.

The integrated navigation data handling unit 830 may be configured to generate an evidence-based integrated navigation pattern for different forms of navigation evidence material, including data extracted based on relevance to original information and validity, and store it in a JSON-based standard format.

More specifically, the integrated navigation data handling unit 830 may include a first header information input part 831, a second header information input part 832, and a body information input part 833.

The first header information input part 831 may be configured to enter ship information and equipment information into an integrated navigation information header for each generated slot in a JSON format.

The second header information input part 832 may be configured to enter information on relevance to the original navigation data into an integrated navigation information header for each generated slot in a JSON format.

Here, the original navigation data may include, for example, original file name, size, date created, and hash values. And, the relevance information may include slot position information (e.g., which navigation position) extracted from the original navigation data, for example, from which block to which block and from which track to which track)

Additionally, the second header information input part 832 may be configured to enter additional information required for ship analysis into an integrated navigation information header for each generated slot in a JSON format. Here, the additional information may include number of tons, length, ship type, etc.

The body information input part 833 may be configured to store the original navigation data and the navigation data as the body of integrated navigation information for each generated slot in a JSON format. The information stored in the body may include, for example, sequence, latitude and altitude, time, COG, and SOG.

The accident reconstruction analysis management unit 840 may be configured to reconstruct the accident by presenting integrated navigation data for each slot by repeatedly entering a number of pieces of data to be reproduced and analyzed for each generated slot. The accident reconstruction analysis management unit 840 may be configured to simultaneously present a plurality of pieces of navigation data in overlapping layers in an integrated manner and reconstruct and analyze the accident for each time slot of each track. The accident reconstruction analysis management unit 840 may be configured to simultaneously present various data stored in a single format extracted from various systems or equipment and reconstruct the accident to understand the situation for each time slot.

Also, FIG. 8 involves a process of collecting evidence, analyzing collected evidence, and integrating navigation data and reconstructing the accident to analyze the accident by using analysis results of the data. All processes are finished after the reconstruction, and once a conclusion is reached, the final new evidence is generated due to the analysis results and needs to be generated as evidence.

Such final evidence is automatically included in a report as key evidence.

That is, if an embodiment of the present disclosure is not applied in this process, it will not be easy to analyze the accident because of differences in evidence, and it will be difficult to perform analysis on the different pieces of evidence because synchronization is not performed. Even if they are displayed simultaneously, there is no management information on the original evidence and altered data. This means that the continuity of evidence management is not maintained, thereby leading to a loss of validity of evidence.

That is, by applying an embodiment of the present disclosure, the probability of technical error may be lowered compared to when an embodiment of the present disclosure is not applied, evidence may be systematically analyzed, and data may be applied in an integrated manner through accident analysis. Thus, it is possible to easily apply multiple analyses of an accident, such as a collision involving a number of ships, in order to enable systematic analysis of which ship is responsible for the accident, thereby solving issues concerning the time taken for analysis.

As seen from above, according to an embodiment of the present disclosure, when there is data for evidence in the analysis of an accident in a conventional forensic system, the continuity of data handling and evidence management is crucial in order to facilitate analysis. It is highly likely that any difficulties in handling, managing, and identifying evidence will adversely affect the integrity management system. However, by proceeding with a data management system according to the present disclosure and performing an integrated analysis simultaneously on a number of pieces of equipment and a number of ships, all aspects of the accident can be systematically analyzed, thereby ensuring the accuracy of accident analysis, data continuity, and data integrity and therefore reducing problems related to the validity of evidence in court.

That is, in the handling of evidence data and the generation of evidence through all processes, the proof of integrity, gathered evidence, the person in charge, data conversion, and associations between the data and the original are systematically organized and confirmed, thereby ensuring that there is no problem in courts.

Moreover, accident-related data such as for various types of ships and control systems can be analyzed simultaneously as a preventative measure against accidents, and the analysis of the cause of the accident and corresponding measures may be very effective in preventing accidents.

Furthermore, any damage to the original data and simply integrating various data in a single form cannot ensure reliability in courts in the process of analyzing evidence data. If data cannot be simultaneously analyzed, it takes more time to analyze each piece of data. That is, it is possible to reduce errors in analyzing the accident by collecting more data and applying it, issues concerning the time taken to identify and distinguish each piece of evidence can be solved, and the admissibility of evidence can be ensured through associations between evidence.

In the present disclosure, data can be altered in the analysis of data if necessary as long as evidence is legally managed. In this alteration process, the relevance to the original can be systematically stored and managed, thereby maintaining the relevance and continuity of the data and confirming the validity of the data. Moreover, by identifying a large amount of data all at once for analysis, it is easy to analyze and reconstruct the accident and find out how the accident happened and the cause of the accident. Furthermore, since it is easy to view and check how data is stored and handled by using an external means, it can be legally checked in courts as well. Additionally, it is possible to make up for lack of data by reconstructing data from various equipment, and navigation data with no time information can be viewed with time information, which gives time information to all data and helps to deal with the accident.

Various implementations of an interface, a device, a server, a unit, a process, a step, etc. to be described in the present disclosure may be implemented in digital electronic circuitry, integrated circuitry, FPGA (field programmable gate array), ASIC (application specific integrated circuit), computer hardware, firmware, software, and/or a combination thereof. These various implementations may include those implemented by one or more computer programs executable on a programmable system. The programmable system includes at least one programmable (which may be a special purpose processor) coupled to receive data and instructions from, and transmit data and instructions to, a storage system, at least one input device, and at least one output device, or may be a general-purpose processor). Computer programs (also known as programs, software, software applications, or code) contain instructions for a programmable processor and are stored on a "computer-readable recording medium".

The computer-readable recording medium includes all types of recording devices in which data readable by a computer system is stored. These computer-readable recording media are non-volatile or non-transitory, such as ROM, CD-ROM, magnetic tape, floppy disk, memory card, hard disk, magneto-optical disk, and storage device. media, and may further include transitory media such as carrier waves (e.g., transmission over the Internet) and data transmission media. In addition, the computer-readable recording medium is distributed in network-connected computer systems, and computer-readable codes may be stored and executed in a distributed manner.

Various implementations of the systems and techniques described herein may be implemented by a programmable computer. Here, the computer includes a programmable processor, a data storage system (including volatile memory, non-volatile memory, or other types of storage systems or combinations thereof), and at least one communication interface. For example, a programmable computer may be one of a server, a network appliance, a set-top box, an embedded device, a computer expansion module, a personal computer, a laptop, a Personal Data Assistant (PDA), a cloud computing system, or a mobile device.

What is claimed is:

1. An apparatus for analyzing and handling heterogeneous navigation data, the apparatus comprising:
    at least one processor; and a memory having instructions stored thereon, which, when executed by the at least one processor, cause the at least one processor to perform:
    an evidence collection unit that collects evidence material relating to an accident;
    an evidence data analysis unit that verifies the integrity of the collected evidence material, and if the collected evidence material is collected from a plurality of manufacturers' equipment models, restores different forms of navigation data, each corresponding to a respective equipment model, by analyzing evidence data relating to the collected evidence material, wherein the equipment model refers to a specific version or implementation of equipment by each manufacturer, which differs in format, type, or content;
    an integrated navigation data handling unit that generates an evidence-based integrated navigation pattern for the different forms of navigation data, the integrated navigation pattern including original information, information on relevance to the original information, and an evidential material for extraction to be used as evidence, and that stores the integrated navigation pattern in a standard format; and
    an accident reconstruction analysis management unit that simultaneously presents multiple pieces of heterogeneous data by layering the integrated navigation pattern, and reconstructs and analyzes the accident for each time slot of each track,
    wherein the evidential material for extraction includes slot position information extracted from the original information, and the slot position information includes information indicating from which block and from which track data is extracted.

2. The apparatus of claim 1, wherein the standard format for the multiple pieces of heterogeneous data includes a JSON (JavaScript Standard Object Notation)-based format.

3. The apparatus of claim 2, wherein the integrated navigation data handling unit stores data in a maritime-related system, including ships, original evidence data, original information taken from the original and extracted for accident analysis, and the information on relevance to the original information for establishing the legal relevance of extracted evidence.

4. The apparatus of claim 2, wherein the integrated navigation data handling unit stores relevance information of a ship or land system or equipment from which data is extracted, based on the JSON.

5. The apparatus of claim 2, wherein the integrated navigation data handling unit stores actual data information which involves navigation data of a ship or land system or equipment from which data is extracted, based on the JSON.

6. The apparatus of claim 2, wherein the integrated navigation data handling unit stores data extracted from a plurality of systems or equipment in the standard format and stores a plurality of pieces of data extracted from the multiple pieces of original data in a single JSON file.

7. The apparatus of claim 2, wherein the accident reconstruction analysis management unit simultaneously presents various data stored in the standard format extracted from a plurality of systems or equipment, and reconstructs the accident to understand the situation for each time slot.

8. The apparatus of claim 2, wherein the accident reconstruction analysis management unit reconstructs and analyzes the accident by processing final collected navigation evidence as integrated navigation data in analyzing the accident.

9. The apparatus of claim 1, wherein the information on relevance to the original information includes information on a person responsible for analysis and processing, the original information, original hash values, where in the original information data is extracted, a standard method of storing processed data, and hash values.

10. A method for analyzing and handling heterogeneous navigation data, the method comprising:
collecting evidence material relating to an accident;
verifying the integrity of the collected evidence material, and if the collected evidence material is collected from a plurality of manufacturers' equipment models, restoring different forms of navigation data, each corresponding to a respective equipment model, by analyzing evidence data relating to the collected evidence material, wherein the equipment model refers to a specific version or implementation of equipment by each manufacturer, which differs in format, type, or content;
generating an evidence-based integrated navigation pattern for the different forms of navigation data, the integrated navigation pattern including original information, information on relevance to the original information, and an evidential material for extraction, and storing the integrated navigation pattern in a standard format; and
simultaneously presenting multiple pieces of data by layering the integrated navigation pattern, and reconstructing and analyzing the accident for each time slot of each track,
wherein the evidential material for extraction includes slot position information extracted from the original information, and the slot position information includes information indicating from which block and from which track data is extracted.

11. The method of claim 10, wherein the standard format for the multiple pieces of heterogeneous data includes a JSON-based format.

12. The method of claim 11, wherein the storing in a standard format comprises storing data in a maritime-related system, including ships, original evidence data, original information taken from the original and extracted for accident analysis, and the information on relevance to the original information for establishing the legal relevance of extracted evidence.

13. The method of claim 11, wherein the storing in a standard format comprises storing relevance information of a ship or land system or equipment from which data is extracted, based on the JSON.

14. The method of claim 11, wherein the storing in a standard format comprises storing actual data information which involves navigation data of a ship or land system or equipment from which data is extracted, based on the JSON.

15. The method of claim 11, wherein the storing in a standard format comprises storing data extracted from a plurality of systems or equipment in the standard format and stores a plurality of pieces of data extracted from the multiple pieces of original data in a single JSON file.

16. The method of claim 11, wherein the reconstructing and analyzing of the accident comprises simultaneously presenting various data stored in the standard format extracted from a plurality of systems or equipment, and reconstructing the accident to understand the situation for each time slot.

17. The method of claim 11, wherein the reconstructing and analyzing of the accident comprises reconstructing and analyzing the accident by processing final collected navigation evidence as integrated navigation data in analyzing the accident.

18. The method of claim 10, wherein the information on relevance to the original information includes information on a person responsible for analysis and processing, the original information, original hash values, where in the original information data is extracted, a standard method of storing processed data, and hash values.

* * * * *